United States Patent [19]

Ledley

[11] Patent Number: 4,747,411
[45] Date of Patent: May 31, 1988

[54] THREE-DIMENSIONAL IMAGING SYSTEM

[75] Inventor: Robert S. Ledley, Silver Spring, Md.

[73] Assignee: National Biochemical Research Foundation, Washington, D.C.

[21] Appl. No.: 594,277

[22] Filed: Mar. 28, 1984

[51] Int. Cl.$^4$ .......................................... AG1B 10/00
[52] U.S. Cl. .................... 128/660; 364/414; 358/88; 73/621; 73/624; 73/626
[58] Field of Search .................... 128/660–663; 73/618, 620, 621, 624, 625, 628, 626; 364/414; 358/88, 91, 92

[56] References Cited

U.S. PATENT DOCUMENTS

| | | | |
|---|---|---|---|
| Re. 30,397 | 9/1980 | King | 128/660 |
| 3,292,018 | 12/1966 | Clynes | 310/8.1 |
| 3,552,382 | 1/1971 | Mount | 128/662 |
| 3,577,772 | 5/1971 | Perilhou et al. | 128/660 |
| 3,681,977 | 8/1972 | Wendt et al. | 73/572 |
| 3,705,261 | 12/1972 | Langley | 358/88 |
| 3,794,964 | 2/1974 | Katakura | 367/7 |
| 3,888,238 | 6/1975 | Meindl et al. | 128/660 |
| 3,936,791 | 2/1976 | Kossoff | 340/1 R |
| 3,964,296 | 6/1976 | Matzuk | 73/607 |
| 4,028,934 | 6/1977 | Sollish | 128/660 |
| 4,075,883 | 2/1978 | Glover | 73/620 |
| 4,109,642 | 8/1978 | Reid et al. | 128/2 V |
| 4,121,468 | 10/1978 | Glover et al. | 73/602 |
| 4,159,462 | 6/1979 | Rocha et al. | 128/661 |
| 4,271,706 | 6/1981 | Ledley | 73/614 |
| 4,292,977 | 10/1981 | Krause et al. | 128/712 |
| 4,398,422 | 8/1983 | Haerten | 128/660 |
| 4,412,249 | 10/1983 | Carmen | 128/660 |
| 4,486,076 | 12/1984 | Taenzer | 128/660 |
| 4,543,960 | 10/1985 | Harui et al. | 128/660 |

FOREIGN PATENT DOCUMENTS

| | | | |
|---|---|---|---|
| 2850251 | 5/1979 | Fed. Rep. of Germany | 128/660 |
| 2914099 | 10/1979 | Fed. Rep. of Germany | 128/660 |
| 2825339 | 12/1979 | Fed. Rep. of Germany | 128/660 |
| 2418472 | 10/1979 | France | 128/660 |

OTHER PUBLICATIONS

Ito et al., "Real Time Display Unit Achieves 3-D Ultrasonic Diagnoses", JEE, Nov. 1979, vol. 16, No. 155, pp. 64–69.

Wells, "Ultrasound 3-D Techniques-Display of Three-Dimensional Data", Biomedical Ultrasonics, Academic Press, 1977, pp. 248–252.

(List continued on next page.)

Primary Examiner—Edward M. Coven
Assistant Examiner—Ruth S. Smith
Attorney, Agent, or Firm—Joseph G. Seeber

[57] ABSTRACT

A three-dimensional imaging system for obtaining a three-dimensional image of an object being scanned ultrasonically comprises a source arrangement for sequentially transmitting ultrasonic energy toward the object in successive directions in a first scanning plane, followed by sequential transmission of ultrasonic energy toward the object in successive directions in successive scanning planes parallel to the first scanning plane, a detector arrangement for receiving reflected energy and converting the reflected energy to electrical signals, and a processor for processing the electrical signals to develop reconstructed image data of the object, the reconstructed image data comprising forward projections of the object into a left image plane and a right image plane to form left and right images, respectively, the left and right images forming a stereo pair for composite display by a display unit. In a further embodiment of the invention, the source arrangement sequentially transmits ultrasonic energy toward the object in successive directions in a first scanning plane, and repeats the sequential transmission of ultrasonic energy in successive scanning planes, the successive planes having increasing angular orientations with respect to the first scanning plane. Further features of the invention include the provision of various source-detector combinations and arrangements, as well as the simultaneous generation of ultrasonic beams having different frequencies in different respective directions during each given scanning cycle.

30 Claims, 7 Drawing Sheets

OTHER PUBLICATIONS

Nathan, "High-Resolution Echo Cardiography", Nasa Tech. Briefs, vol. 4, No. 1, Spring 1979 p. 81.

Nakatani et al. "A Binocular Stereoscopic Display System for Echocardiography", IEEE Transactions on Biomedical Engineering, vol. BME-26, No. 2, Feb. 1979, pp. 65–68.

Talbert, "An Add-On" Modification for Linear Array Real-Time Ultrasound Scanner's to Produce 3-Dimensional Displays", Conference: Ultrasonics International, Brighton, England, 28-30, Jun. 1977, pp. 57-67.

Itoh et al., "A Computer-Aided Three Dimensional Display System for Ultrasonic Diagnosis of a Breast Tumor", Ultrasonics, vol. 17, No. 6, Nov. 1979, pp. 261-268.

Hoshino et al., "Micro-Programmable Ultrasonic Image Processor and its Applications to Image Manipulation", SPIE, vol. 314, Digital Radiography, 1981, pp. 354-361.

Julesz, "Texture and Visual Perception", *Scientific American*, Feb. 1965, pp. 38-48.

Ross, "The Resources of Binocular Perception", *Scientific American*, Mar. 1976, pp. 80-86.

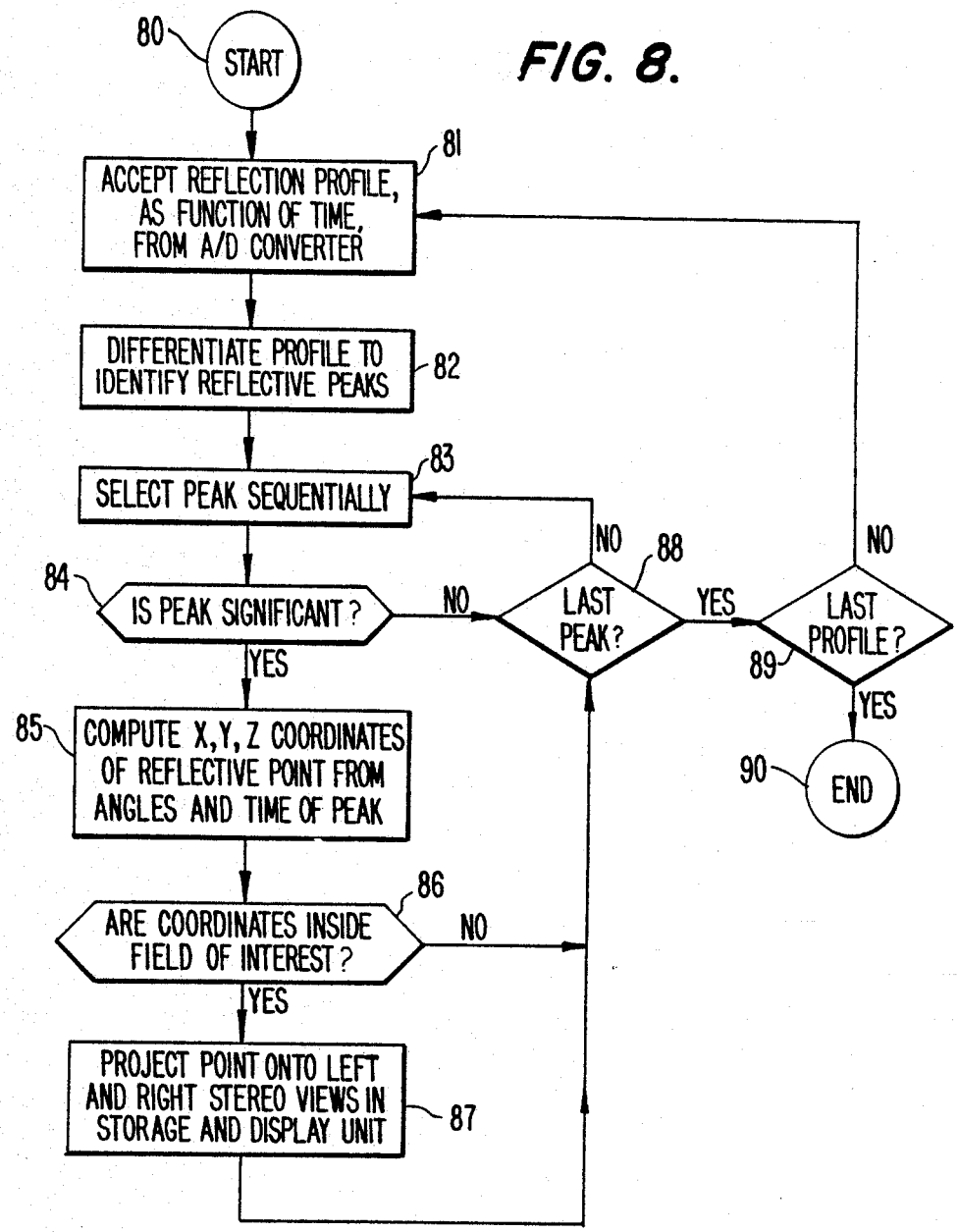

THREE-DIMENSIONAL IMAGING SYSTEM

BACKGROUND OF THE INVENTION

1. Field of the Invention

The present invention relates to a three-dimensional imaging system for obtaining a three-dimensional image of an object. In particular, the invention relates to a three-dimensional ultrasound imaging system for obtaining a three-dimensional image of an object scanned using ultrasound scanning techniques disclosed below.

2. Description of the Prior Art

Ultrasound scanning systems of various types are well-known in the prior art. For example, most prior art medical ultrasound scanning systems generally utilized may be classified as A-type or B-type.

In an A-type ultrasound scanner, a fixed transducer provides an ultrasound pulse which is directed along a fixed path into a body or object. The times of return for reflections from internal organic interfaces are detected to provide an indication of the distance to such interfaces.

In a B-type scanner, a pulsed ultrasonic beam is swept in a single direction, and, as in the A-type scanner, the successive distances or ranges to reflecting organic interfaces are determined by standard intervalometer methods. These B-type scanners typically provide an indicia of the interface by, in effect, plotting the detected distances against the position of the beam path. Various B-type scanners have included a real-time display, and have effected scanning electrically, for example. by use of a phased transducer array.

U.S. Pat. No. 4,271,706 - Ledley discloses an ultrasonic scanner in which an ultrasonic pulse is directed into a body and electrical representations of pulse reflections from body interfaces, along the path of the ultrasonic pulse, are generated. In the ultrasonic scanner of that patent, the ultrasonic signal path is scanned through a volume of the body, and position signals indicative of the instantaneous position are generated. The reflection signals are selectively gated in accordance with a predetermined function of the path disposition to provide a display selectively representing desired interfaces situated within a selected contoured portion of the volume being scanned. By varying the predetermined function, a specific desired interface surface may be displayed. Provisions for developing a three-dimensional display of the selected surface are described in the aforementioned patent.

Other methods and devices for representing electrical spatial curves and spatial images of electrically reproduced ultrasonic images, X-ray images or cardiac vector loops, as well as an apparatus for collecting three dimensional data relating to the size, shape, location and nature of soft tissue organ structures, are disclosed in U.S. Pat. No. 4,292,977 - Krause et al and U.S. Pat. No. Re. 30,397 - King. In addition, an ultrasonic stereoscopic imaging device or apparatus for three-dimensional visualization of an object or substance is disclosed in U.S. Pat. No. 4,028,934 - Sollish.

Arrangements involving arrays of transducers, or of ultrasonic transmitters and/or receivers, are disclosed in U.S. Pat. No. 3,292,018 - Clynes, U.S. Pat. No. 3,552,382 - Mount, and U.S. Pat. No. 3,577,772 - Perilhou et al.

The following U.S. Pat. Nos. disclose other ultrasonic systems and devices: 3,681,977 - Wendt et al; 3,888,238 -Meindl et al; 3,936,7971 - Kossoff; 3,964,296 - Matzuk; 4,075,883 - Glover; 4,109,642 - Reid et al; and 4,121,468 - Glover et al.

The ultrasonic arrangements, devices and systems described in the aforementioned patents are characterized by certain disadvantages. For example, ultrasonic arrangements, devices and systems of the prior art failed to take advantage of theories relating to texture and visual perception, as well as binocular perception. Such theories and the related theoretical techniques are disclosed in the following two articles: "Texture and Visual Perception", by Bela Julesz, *Scienific American*, February 1965, pages 38-48; and "The Resources of Binocular Perception", by John Ross, *Scientific America*, March 1976, pages 80-86.

Related to the latter observation is the further observation that ultrasonic arrangements, devices and systems of the prior art failed to take advantage of the advanced state of computer and data processing technology, and specifically failed to take advantage of the savings in hardware which can be achieved by development and adoption of sophisticated data processing/-programming techniques for processing ultrasonic system data to derive reconstructed image data for the three-dimensional display of three-dimensional images of objects scanned by the three-dimensional imaging system.

SUMMARY OF INVENTION

The present invention relates to a three-dimensional imaging system for obtaining a three-dimensional image of an object scanned by the imaging system.

More specifically, one embodiment of the three-dimensional imaging system of the present invention comprises a source arrangement for sequentially transmitting ultrasonic energy toward and object in successive directions in a first scanning plane, and then repeating the sequential transmission of ultrasonic energy toward the object in the successive directions in successive scanning planes parallel to the first scanning plane, a detector arrangement for receiving energy reflected from the object and converting the reflected energy to electrical signals, and a processor connected to the detector arrangement for processing the electrical signals to develop reconstructed image data relating to the object scanned. In particular, the detector arrangement is disposed in an image plane displaced from the object being scanned and divided into a left image plane and a right image plane, the reconstructed image data being developed as a result of operation of the processor to derive forward projections of the object onto the left image plane and the right image plane to develop a first image and a second image, respectively, the first and second images forming a stereo pair. The system further comprises a display unit for displaying the first and second images compositely, thus displaying the three-dimensional image of the object.

In a further embodiment of the three-dimensional imaging system of the present invention, the source arrangement sequentially transmits ultrasonic energy toward the object in successive directions in a first scanning plane, and then repeats the sequential tranmission of the ultrasonic energy toward the object in successive directions in successive scanning planes, the successive scanning planes having increasing angular orientations with respect to the first scanning plane. Energy reflected from the object is converted to electrical signals by the detector arrangement, and then the processor processes the electrical signals to develop reconstructed image data by deriving forward projections of the object onto a left image plane and a right image plane to develop a first image and a second image, respectively, the latter forming a stereo pair of images for composite display on a display unit.

In accordance with further teachings of the invention, either a plurality of source-detector pairs, one for each scanning plane, can be arranged in a line contained within the image plane, and can be arranged to scan the object in a first scanning plane and in successive, parallel scanning planes, respectively, or a single source-detector pair can be disposed at a point (for example, a point of intersection between the image plane and the first scanning plane), and can be arranged to scan the object in the first scanning plane and in successive scanning planes having increasing angular orientations with respect to the first scanning plane.

In addition, scanning in each scanning plane can be accomplished either by a single source and a single detector, or by a pair of sources and a corresponding pair of detectors, or by a single source and a pair of detectors.

Finally, significant savings in scanning time with respect to each scanning plane can be achieved by providing a source which, rather than sequentially scanning in different directions within a given scanning plane, simultaneously transmits scanning signals of different respective frequencies in different respective directions within a given scanning plane.

Therefore, it is a primary object of the present invention to provide a three-dimensional imaging system for obtaining a three-dimensional image of an object being scanned.

It is an additional object of the present invention to provide a three-dimensional imaging system wherein a source arrangement sequentially transmits ultrasonic energy toward an object being scanned in successive directions in a first scanning plane, and repeats the sequential transmission of ultrasonic energy toward the object in successive directions in successive scanning planes parallel to the first plane.

It is an additional object of the present invention to provide a three-dimensional imaging system wherein a source arrangement sequentially transmits ultrasonic energy toward an object being scanned in successive directions in a first scanning plane, and repeats the sequential transmission of ultrasonic energy toward the object in successive directions in successive scanning planes, the successive scanning planes having increasing angular orientations with respect to the first scanning plane.

It is an additional object of the present invention to provide a three-dimensional imaging system wherein a source arrangement transmits ultrasonic signals having different respective frequencies in different respective directions toward the object in a first scanning plane, and repeats the transmission of ultrasonic signals having different respective frequencies toward the object in successive scanning planes parallel to the first scanning plane.

It is an additional object of the present invention to provide a three-dimensional imaging system having a source arrangement which transmits ultrasonic signals having different respective frequencies toward the object in different respective directions in a first scanning plane, and repeats the transmission of the ultrasonic signals having different respective frequencies toward the object in successive scanning planes, the successive scanning planes having increasing angular orientations with respect to the first scanning plane.

It is an additional object of the present invention to provide a three-dimensional imaging system having a source arrangement which comprises a plurality of source-detector pairs, one for each scanning plane.

It is an additional object of the present invention to provide a three-dimensional imaging system having a source arrangement comprising a single source-detector pair of performing ultrasonic scanning in a first scanning plane and successive scanning planes, the successive scanning planes having increasing angular orientations with respect to the first scanning plane.

It is an additional object of the present invention to provide a three-dimensional imaging system having a source arrangement comprising, in a given scanning plane, a single source and a single detector.

It is an additional object of the present invention to provide a three-dimensional imaging system having a source arrangement comprising, for a given scanning plane, first and second source-detector pairs.

It is an additional object of the present invention to provide a three-dimensional imaging system having a source arrangement comprising, for a given scanning plane, a single source and a pair of detectors.

The above and other objects that will hereinafter appear, and the nature of the invention, will be more clearly understood by reference to the following description, the appended claims, and the accompanying drawings.

BRIEF DESCRIPTION OF DRAWINGS

FIG. 8 is a flowchart of the operations performed by the image processor 72 of FIG. 7.

DETAILED DESCRIPTION

The invention will now be more fully described with reference to FIGS. 1A-1C, which are utilized to discuss binocular perception theory as it relates to the present invention.

Figure 1A:
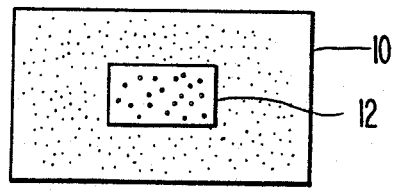
FIGS. 1A-1C are graphical illustrations used to describe binocular perception theory as it relates to the present invention.

FIG. 1A depicts a front view of two planes 10 and 12, each containing a random dot pattern. FIG. 1B is a top view of the two planes 10 and 12, wherein it is seen that the plane 12 is located in front of the plane 10. Also seen in FIG. 1B are left and right image planes 14 an 16, which can be thought of as corresponding to the image planes formed by the retinae of the left and right eyes of a person viewing the two planes 10 and 12. In FIG. 1B, the dotted lines represented forward projections of the patterns, contained on planes 10 and 12, respectively, onto image planes 14 and 16, respectively.

Figure 1B:
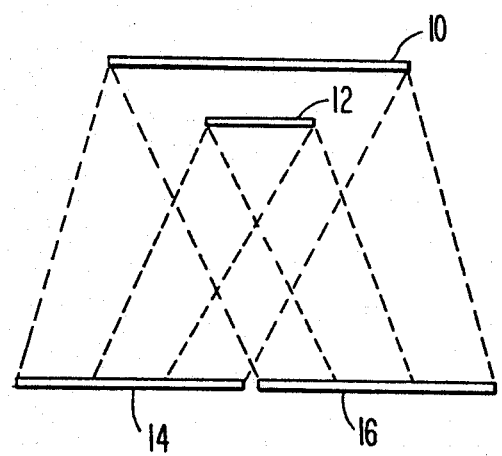
Figure 1C:
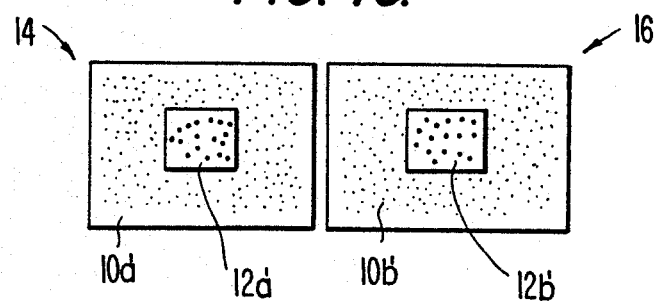

Turning to FIG. 1C, that figure depicts the projections, onto image planes 14 and 16, respectively, of the images contained on planes 10 and 12, respectively, of FIG. 1B. The projections of the pattern contained on plane 10 onto image planes 14 and 16, respectively, are designated by reference numerals 10a' and 10b', respectively, whereas the projections of the pattern contained on plane 12 onto image planes 14 and 16, respectively, are designated by reference numerals 12a' and 12b', respectively.

If the random dot patterns contained on planes 10 and 12 are viewed monocularly, only a two-dimensional perception results. That is, the monocular perception of the random dot patterns contained on planes 10 and 12 of FIG. 1A will correspond to one or the other of the monocular images 10a', 12a' or 10b', 12b' appearing on image planes 14 and 16, respectively, of FIG. 1C. However, if the random dot patterns on planes 10 and 12 of FIG. 1A are viewed binocularly, the stereo pair of images designated 14 and 16, as seen in FIG. 1C, will result.

In terms of human viewing of the patterns contained on planes 10 and 12, the human brain acts as a processor and processes the stereo pair of monocular images so as to form, in the "mind's eye", a three-dimensional image of planes 10 and 12. Thus, a human who views planes 10 and 12 binocularly will perceive plane 12 as being displaced vertically (in the third dimension) with repsect to plane 10.

The present invention exploits the latter theory in the development of an ultrasonic imaging system which has minimal hardware by virtue of the fact that sophisticated programming techniques are employed to process stereo images of reflected ultrasonic energy so as to reconstruct a three-dimensional image of an object scanned ultrasonically.

Figure 2A:
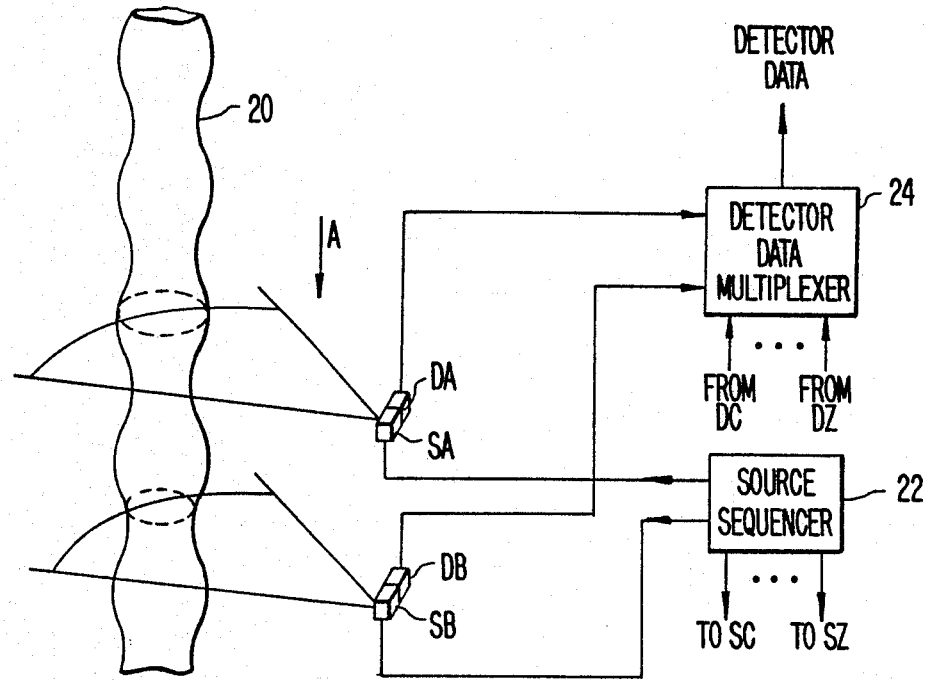
FIG. 2A is a diagrammatic represenation of one embodiment of the present invention, employing parallel scanning planes.

FIG. 2A depicts a first embodiment of the present invention. As seen therein, a plurality of sources SA, SB, . . . and detectors DA, DB, . . . are arranged in an image plane displaced from an object 20 to be scanned. Each of the sources SA, SB, . . . is connected to a source sequencer 22, which is a conventional sequencing device for activating each of the ultrasonic sources SA, SB, . . . in sequence to scan the object 20. Thus, soruce SA will scan the object 20 during a first scanning cycle, course SB will scan the object 20 during a second scanning cycle, and so forth.

Figure 2B:
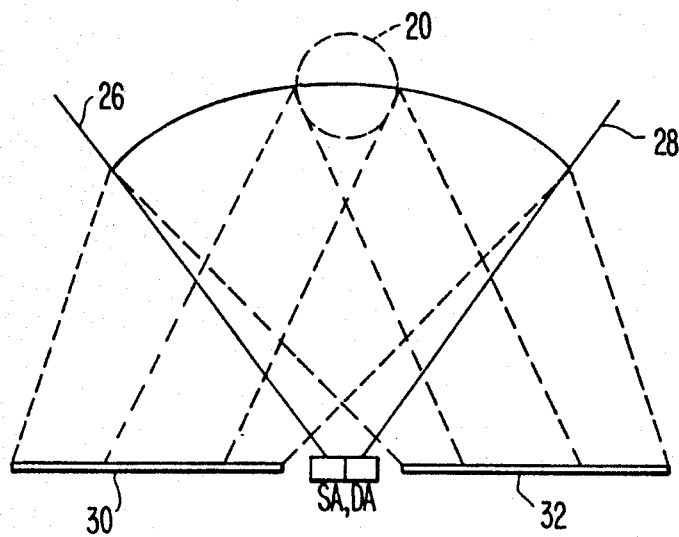
FIG. 2B is a top view of the embodiment of FIG. 2A, as seen along arrow A in FIG. 2A.

Turning to FIGS. 2B, which is a top view of the embodiment of FIG. 2A, as viewed along arrow A in FIG. 2A, scanning of the object 20 by each source (for example, source SA) consists of the transmission of ultrasonic energy in a first direction 26, followed by successive transmissions of ultrasonic energy in directions displaced by increasing angular amounts from direction 26 until transmission in direction 28 is achieved. In accordance with well-known ultrasonic scanning techniques, the ultrasonic energy will be reflected from material, such as as material of the object 20, appearing in the scan path. Such reflected ultrasonic energy will be detected by detectors DA, DB, . . . , such detectors providing detection outputs to a detector data multiplexer 24.

Detector data multiplexer 24 is a conventional device which polls each of detectors DA, DB, . . . in succession, and in correspondence to the scanning cyles of sources SA, SB, . . . Data from the detectors DA, DB, . . . , as multiplexed by detector data multiplexer 24, is provided as a detector data output to the image processing system associated with the present invention, as described subsequently with reference to FIG. 7.

Figure 2C:
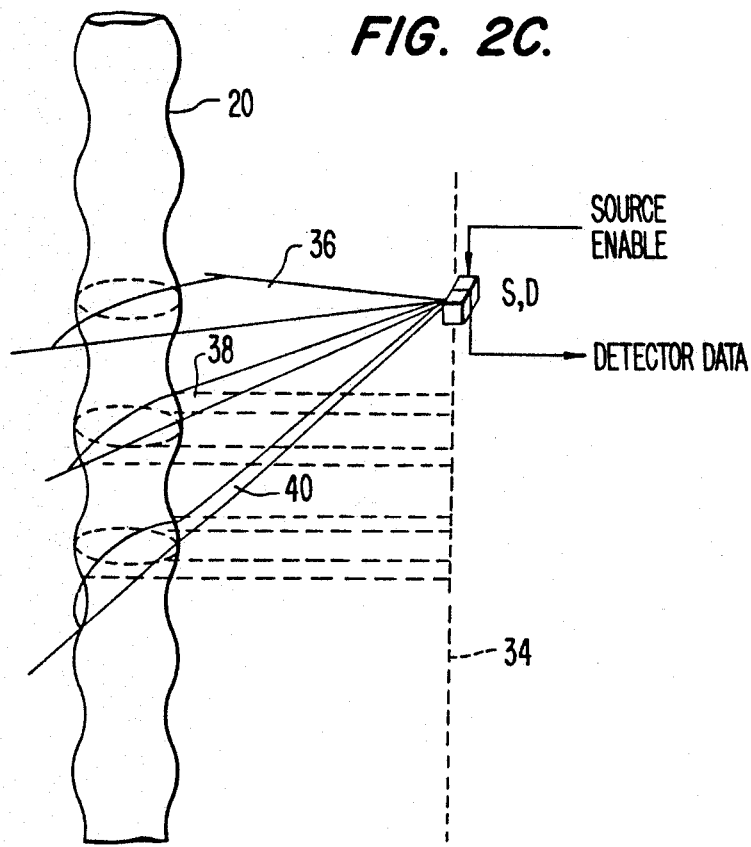
FIG. 2C is a diagrammatic representation of a further embodiment of the invention, employing a first scanning plane and successive scanning planes having increasing angular orientations with respect to the first scanning plane.

FIG. 2C is a diagrammatic representation of a second embodiment of the invention, wherein a single source S and a single detector D are disposed in an image plane, designated by reference numeral 34, in opposition to an object 20 to be scanned. In this embodiment, ultrasonic scanning of the object 20, by means of the transmission of ultrasound signals by source S, takes place in a first scanning plane 36, and is then repeated in successive scanning planes 38, 40, and so forth, each successive scanning plane being angularly displaced from the first scanning plane 36 by increasing angular amounts. Either a manual technique, or any conventional motor capable of imparting motion in two dimensions (such as that in previously discussed U.S. Pat. No. 4,271,706 - Ledley), or a combination thereof, can be used to drive the source of FIG. 2C.

Energy reflected from the object 20 as a result of each scanning cycle is received by the single detector D, which provides detector data to the image processing system, which will be described in more detail below with reference to FIG. 7. At this juncture, it is sufficient to state that the image processing system processes the detector data so as to develop data representing forward projections of the object 20 onto image plane 34, such as forward projections being repesented by the horizontal dotted lines perpendicular to the image plane 34 in FIG. 2C.

Figure 3:
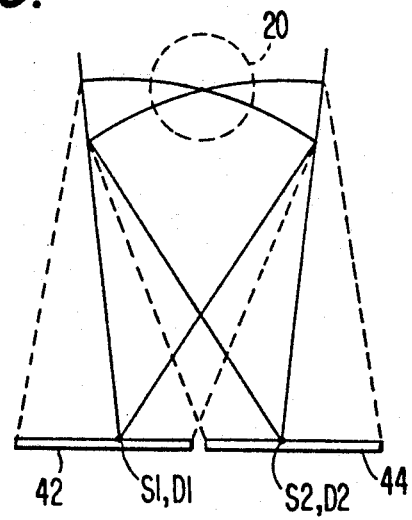
FIG. 3 is a top view of a further embodiment of the invention, employing two source-detector pairs.

FIG. 3 is a diagrammatic representation of a further embodiment of the invention, employing two source-detector pairs. Specifically, a source S1 and a detector D1 form a source-detector pair positioned at the center of a left image plane 42, while a source S2 and a detector D2 form a second source-detector pair positioned at the center of a right image plane 44.

In operation, each source-detector pair scans the objct 20 with ultrasound energy during a given scanning cycle. Reflected energy is received by detectors D1 and D2, respectively, and corresponding detector data are provided to the image processing system. The image processing system processes the detector data, in a manner to be discussed in more detail below, so as to develop image data representing forward projections of the object 20 in both the left plane 42 and right plane 44, the image data in these two planes forming a stereo pair.

It is to be recognized that this embodiment of the invention, involving two source-detector pairs, can be utilized in combination with the embodiment of FIG. 2A, in which case there would be two source-detector pairs for each parallel scanning plane, or can be utilized in combination with the embodiment of FIG. 2C, in which case there would be two source-detector pairs positioned in image plane 34 (see FIG. 2C), which source-detector pair would generate successive pairs of scans coresponding to scans 36, 38, 40 and so forth, each pair of scans angularly displaced with respect to the preceding pairs of scans.

Figure 4:
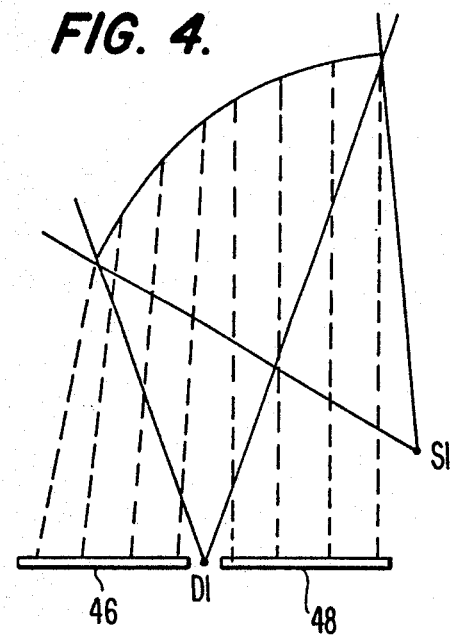
FIG. 4 is a top view of a further embodiment of the invention, employing a single source-detector pair.

FIG. 4 is a diagrammatic representation of a further embodiment of the invention, wherein a single source-detector pair, comprising source S1 and detector D1, is employed. In this embodiment, the source S1 is located at a different position with respect to the position of detector D1, as shown in FIG. 4. When ultrasonic energy is transmitted by source S1 toward the object 20, the resulting reflected energy is received by detector D1, which provides detector data to the image processing system, the latter processing the detector data to develop image data representing forward projections onto the left plane 46 and right plane 48 of FIG. 4.

Again, it is to be recognized that this embodiment of the invention can be combined with the embodiments of FIG. 2A or 2C, such that there would be one source-detector pair for each parallel scanning plane (as in FIG. 2A), or one source-detector pair for generating each of the angularly displaced scans 36, 38, 40, etc. (as in FIG. 2C).

Figure 5:
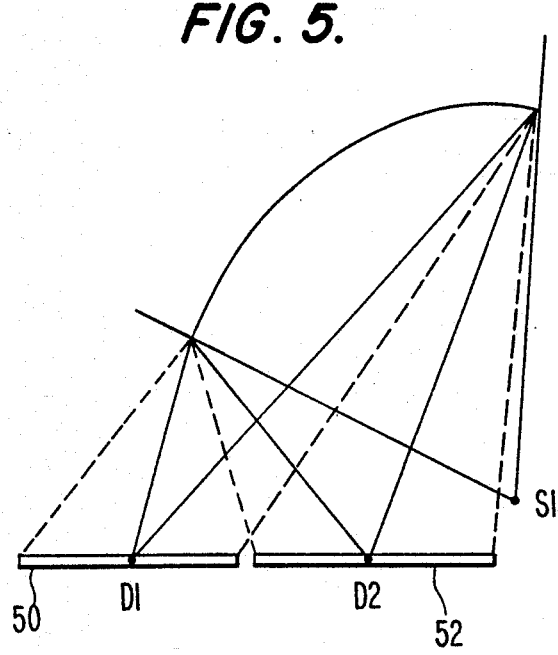
FIG. 5 is a top view of a further embodiment of the invention, employing a single source and a pair of detectors.

FIG. 5 is a diagrammatic representation of a further embodiment of the invention, involving the employment of a single source S1 for transmitting ultrasonic energy toward the object 20, in combination with two detectors D1 and D2, each detector being positioned at the center of a respective image plane 50 or 52. Again, this embodiment of FIG. 5 can be utilized in combination with either the embodiment of FIG. 2A or the embodiment of FIG. 2C.

Figure 6A:
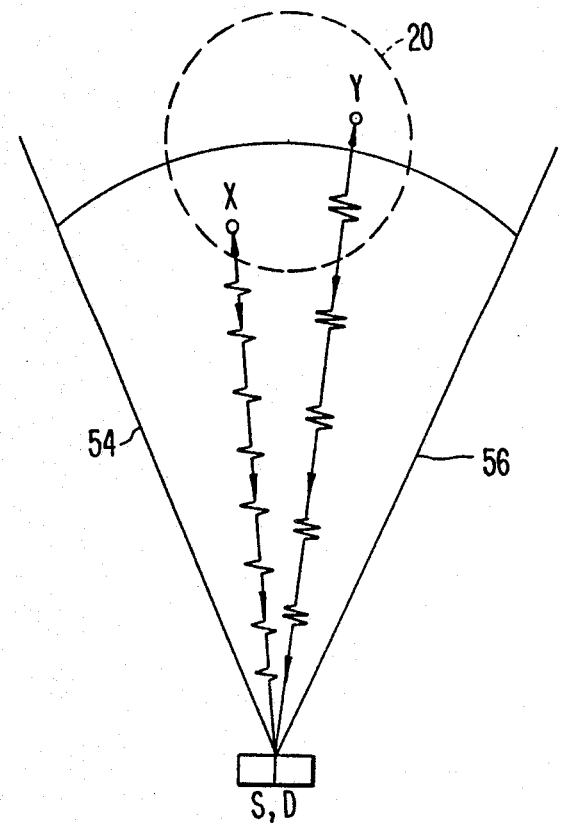
FIG. 6A is a top view of a further embodiment of the invention, employing the transmission of different respective frequencies in different respective directions within a given scanning plane.

FIG. 6A is a diagrammatic representation of a further embodiment of the invention, wherein a single source-detector pair S, D is employed to generate, on a simultaneous basis, a plurality of scanning beams or signals having different respective frequencies in different directions. Thus, a predetermined plurality of beams disposed at predetermined angular intervals from left scanning beam 54 through right scanning beam 56 are generated simultaneously, with each respective scanning beam having a different respective frequency.

When energy is reflected, the reflected energy is received by the detector D, and corresponding detector data is provided to the image processing system. Thus, even though the ultrasonic beams or signals are generated simultaneously, and the corresponding detector data is received virtually simultaneously, reflected energy corresponding to one ultrasonic transmission can be distinguished from reflected energy corresponding to the other ultrasonic transmissions by virtue of the differences in frequency. It is to be recognized that this multi-frequency techique can be employed in any of the embodiments described above so as to effect simultaneous ultrasound beam transmission. This results in an extremely short scanning cycle, with overall savings in operational time, as well as achievement of the advantage of superior responsiveness of the overall system.

Figure 6B:
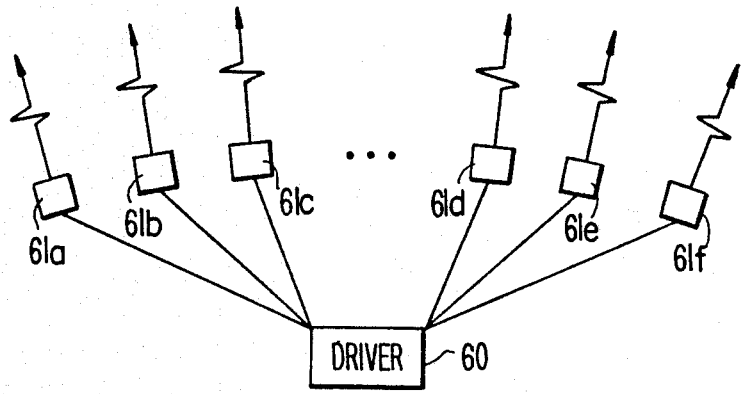
FIGS. 6B and 6C are source arrangements and FIG. 6D is a detector arrangement for implementing the embodiment of FIG. 6A.
Figure 6C:
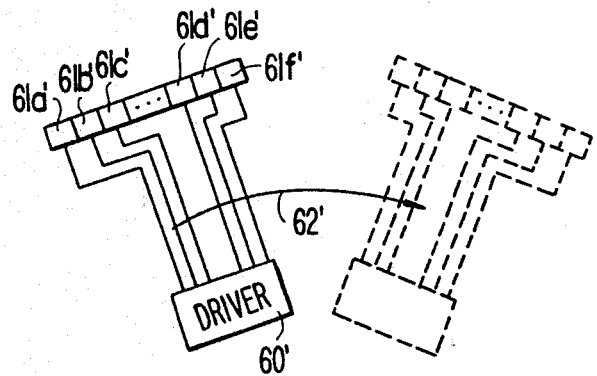

It is to be appreciated that various source-detector arrangements may be utilized in implementing the multi-frequency technique described above. For example, as shown in FIG. 6B, a plurality of crystal oscillators 61a–61f can be arranged in an angular array around a driver 60, the latter successively activating each oscillator for generating successive signals of different frequencies in respective directions. Alternatively, as shown in FIG. 6C, an arrangement of a plurality of oscillators 61a'–61f' can be connected in common to a driver 60', and can be arranged to rotate in an angular direction as indicated by the arrow 62, the drive 60' being operated at each successive angular position to activate a respective one of the oscillators 61a'–61f', thus generating signals of different frequencies in different respective directions.

Figure 6D:
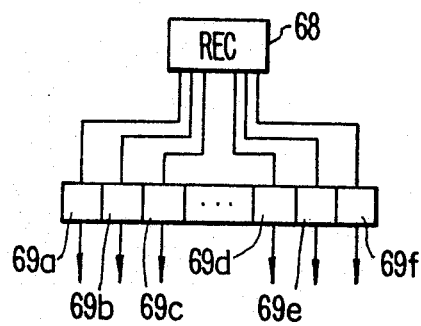

With respect to the detection of the signals of different frequencies, a detector arrangement such as that shown in FIG. 6D can be employed. Such a detector arrangement comprises a receiver 68 connected in common to a plurality of filters 69a–69f, each filter having a respective output for providing its respective analog data output to the image processor (as discussed below). In this manner, the image processor is able to differentiate signals of different frequencies as received from different respective scan directions.

Figure 7:
FIG. 7 is a block diagram of the three-dimensional imaging system of the present invention.

FIG. 7 is a block diagram of the image processing system employed with the present invention. As seen therein, the image processing system of the present invention basically comprises an analog-to-digital converter (ADC) 70, an image processor 72, and a storage and display unit 74.

The ADC 70 is a standard or conventional analog-to-digital converter which converts the analog detector data received from the detector(s) to digital form for input to the image processor 72.

The image processor 72 is a conventional digital computer which is programmed to process the digital detector data in such a manner (to be described below) as to compute the image data representing forward projections of the reflected ultaasound energy (and thus of the objects encountered by the transmitted ultrasonic energy) onto the image plane(s), as mentioned above.

The storage and display unit 74 is a conventional storage and display unit which, in response to the digital image data (to coordinate data) developed by the image processor 72, in correspondence to the computed forward projection data, displays in two-dimensional form a virtual three-dimensional image representing the object 20 scanned by the ultrasonic scanning system described above.

It is to be noted that the ADC 70 can be implemented by any conventional analog-to-digital converter. The image processor 72 can be implemented by any conventional image processor, such as the IP 5000 manufactured by DeAnza Systems. The storage and display unit 74 can be any conventional storage and display unit employed in image processing systems, such as the RAMTEK display unit manufactured by Ramtek Corporation.

FIG. 8 is a flowchart of program operations performed by the image processor 72 in accordance with the present invention. Referring to FIG. 8, the operations of the image processor 72 are as follows. When processing is to start (block 80), the image process 72 accepts a reflection profile as a function of time from the ADC 70 (block 81). This reflection profile data is differentiated to identify reflective peaks (block 82). Each peak identified within the reflection profile is selected sequentially (block 83), and a decision is made as to whether or not the peak is significant (block 84). Significance of a peak is determined based on various well-known threshold-related or parameter-related techniques, as would be obvious to one of skill in the art.

If the peak is determined to be significant, the X, Y and Z coordinates of the reflective point are computed from the angles and time interval (duration between transmission and reception of a signal reflected from the object being scanned) of each peak (block 85). Computations are performed in accordance with the following well-known coodinate equations:

$$\overline{X} = kT/2 \cdot \cos\phi_i \cdot \overline{I}$$

$$\overline{Y} = kT/2 \cdot \cos\phi_j \cdot \overline{J}$$

$$\overline{Z} = kT/2 \cdot \cos\phi_k \cdot \overline{K}$$

where k is a scaling factor, T is the time interval for the reflected beam, $\phi_i$, $\phi_j$ and $\phi_k$ are angles of the beam measured with respect to unit vectors $\overline{I}$, $\overline{J}$ and $\overline{K}$.

Once the computation of the X, Y and Z coordinates is carried out, a decision is made as to whether or not the coordinates are inside the field of itnerest, using further well-known parametric techniques (block 86). If the coordinates are inside the field of interest, the computed coordinates are used to project the detected point onto left and right stereo views in the storage and display unit 74 (block 87).

If (referring to block 84) the peak is determined not to be significant, or if (referring to block 86) the coordinates are determined not to be inside the field of interest, or if (referring to block 87) a point is projected onto the left and right stereo views in the storage and display unit 74, a further determination as to whether or not the last peak has been sequentially processed is made (block 88). If the last peak has not been processed, the next peak is sequentially selected (block 83), and processing continues (blocks 84-87). If the last peak has been processed (block 88), a determination as to whether or not the last profile has been accepted is made (block 89).

If the last profile has not been accepted, the processor accepts another reflection profile (block 81) and processing of that reflection profile proceeds. If, on the other hand, the last profile has been accepted (block 89), the processor 72 ceases operation (block 90).

It should be recognized that the ultrasonic sources SA, S1, S2, and so forth, referred to above can be implemented by any conventional source of ultrasonic energy, as is well known to those of skill in the art. Such ultrasonic energy sources are to be adapted to provide for ultrasonic scanning of an object in terms of (1) the successive transmission of ultrasonic beams in successively incremented angular directions (as described above with respect to FIGS. 2A and 2B), (2) the generation of successive scanning beam cycles occurring in successive scanning planes, the scanning planes having increasing angular orientations with respect to a first scanning plane (as described above with respect to FIG. 2C), and (3) the transmission of a plurality of ultrasonic beams of different respective frequencies in different angular directions (as described above with reference to FIGS. 6A-6D).

In addition, it is to be recognized that the detectors DA, D1, D2, and so forth, described above can be implemented by any conventional detector(s) capable of detecting reflected ultrasonic energy and providing corresponding analog detector data to an image processing system, provided that such detectors are adapted to provide the functions of the present invention, as described above.

As is well known to those of skill in the art, the sources and detectors described above can be provided in the form of transducer elements, arranged either singularly or in transducer arrays. With respect to the provision of transducer arrays, it is also to be recognized that phased arrays of transducers can be employed without departing from the scope of the present invention.

While preferred forms and arrangements have been shown in illustrating the invention, it is to be clearly understood that various changes in detail and arrangement may be made without departing from the spirit and scope of this disclosure.

What is claimed is:

1. A three-dimensional imaging system for obtaining a three-dimensional image of an object, comprising:
    source means for sequentially transmitting ultrasonic energy toward said object in successive directions in a first scanning plane, said successive directions having increasing angular orientations with respect to a reference direction, and for repeating the sequential transmission of ultrasonic energy toward said object in said successive directions in successive scanning planes parallel to said first scanning plane;
    detector means for receiving reflected energy reflected from material of said object, and for converting said reflected energy to electrical signals; and
    processing means connected to said detector means for receiving said electrical signals, and for processing said electrical signals to develop reconstructed image data of said object;
    wherein said detector means is disposed in an image plane displaced from said object and divided into a left image plane and a right image plane, said detector means comprising a plurality of ultrasonic transducers arranged in a line in said image plane, said line forming a boundary between said left image plane and said right image plane, said reconstructed image data comprising forward projections of said object into a first image in said left image plane and a second image in said right image plane, said first and second images forming a stereo pair;
    said system further comprising display means for displaying said first and second images compositely, whereby to display said three-dimensional image of said object.

2. The system of claim 1, wherein said source means comprises a plurality of ultrasonic sources arranged in a line in said image plane, said line forming a boundary between said left and right image planes.

3. The system of claim 1, wherein said source means comprises a plurality of ultrasonic sources arranged in a line perpendicular both to said first scanning plane and to said successive scanning planes.

4. The system of claim 1, wherein said plurality of ultrasonic transducers is arranged in a line perpendicular both to said first scanning plane and to said successive scanning planes.

5. The system of claim 1, further comprising additional source means for sequentially transmitting ultrasonic energy toward said object in additional successive directions in said first scanning plane, said additional successive directions having increasing angular orientations with respect to an additional reference direction, and for repeating the sequential transmission of ultrasonic energy toward said object in said additional successive directions in said successive scanning planes parallel to said first scanning plane.

6. A three-dimensional imaging system for obtaining a three-dimensional image of an object, comprising:

source means for sequentially transmitting ultrasonic energy toward said object in successive directions in a first scanning plane, said successive directions having increasing angular orientations with respect to a reference direction, and for repeating the sequential transmission of ultrasonic energy toward said object in said successive directions in successive scanning planes parallel to said first scanning plane;

detector means for receiving reflected energy reflected from material of said object, and for converting said reflected energy to electrical signals; and processing means connected to said detector means for receiving said electrical signals, and for processing said electrical signals to develop reconstructed image data of said object;

wherein said detector means is disposed in an image plane displaced from said object and divided into a left image plane and a right image plane, said reconstructed image data comprising forward projections of said object into a first image in said left image plane and a second image in said right image plane, said first and second images forming a stereo pair;

said system further comprising display means for displaying said first and second images compositely, whereby to display said three-dimensional image of said object;

wherein said detector means comprises a first plurality of ultrasonic transducers arranged in a first line in said left image plane, each of said transducers of said first plurality of transducers being disposed in a respective one of said first scanning plane and said successive scanning planes, said detector means further comprising a second plurality of ultrasonic transducers arranged in a second line in said right image plane, each of said transducers of said second plurality of transducers disposed in a respective one of said first scanning plane and said successive scanning planes.

7. The system of claim 6, wherein said source means comprises a plurality of ultrasonic sources arranged along said first line, each of said sources being disposed in a respective one of said first scanning plane and said successive scanning planes, said system further comprising additional source means for sequentially transmitting ultrasonic energy toward said object in additional successive directions in said first scanning lane, said additional successive directions having increasing angular orientations with respect to an additional reference direction, and for repeating the sequential transmission of ultrasonic energy toward said object in said additional successive directions in said successive scanning planes parallel to said first scanning plane, said additional source means comprising a plurality of further ultrasonic sources arranged along said second line, each of said further ultrasonic sources being disposed in a respective one of said first scanning plane and said successive scanning planes.

8. A three-dimensional imaging system for obtaining a three-dimensional image of a three-dimensional object, comprising:

source means disposed at a given point displaced from the three-dimensional object for transmitting ultrasonic energy from the given point toward the three-dimensional object in successive directions in a first scanning plane, each successive direction having an angular orientation, with respect to a reference direction in the first scanning plane, which is greater then the angular orientation with respect to the reference direction of any preceding direction, and for repeating the transmission of ultrasonic energy from the given point toward the three-dimensional object in successive directions in successive scanning planes, wherein each successive scanning plane has an angular orientation, measured at the given point and with respect to said first scanning plane, which is greater than the angular orientation of any preceding scanning plane as measured at the given point and with respect to the first scanning plane, whereby said source means transmits ultrasonic energy in said first scanning plane and in successive scanning planes having increasing angular orientations with respect to said first scanning plane;

detector means for receiving reflected energy reflected from material of the three-dimensional object as a result of scanning of said three-dimensional object by said source means in said first and said successive scanning planes, and for converting said reflected energy to electrical signals, wherein said detector means is disposed in an image plane displaced from the three-dimensional object, the image plane being perpendicular to the first scanning plane, the image plane being divided into a left image plane and a right image plane;

processing means connected to said detector means for receiving said electrical signals, and for processing said electrical signal to develop reconstructed image data of the three-dimensional object, said reconstructed image data developed by said processing means corresponding to forward projections of the three-dimensional object into said left image plane to form a first image and into said right image plane to form a second image, said first and second images forming a stereo pair; and display means connected to said processing means and responsive to said reconstructed image data developed by said processing means for displaying said first and second images compositely, thereby displaying said three-dimensional image of the three-dimensional object;

wherein said source means comprises an ultrasonic source disposed in said image plane on a line perpendicular both to said first scanning plane and to said forward projections, said line forming a boundary between said left and right image planes.

9. A three-dimensional imaging system for obtaining a three-dimensional image of a three-dimensional object, comprising:

source means disposed at a given point displaced from the three-dimensional object for transmitting ultrasonic energy from the given point toward the three-dimensional object in successive directions in a first scanning plane, each successive direction having an angular orientation, with respect to a reference direction in the first scanning plane, which is greater then the angular orientation with respect to the reference direction of any preceding direction, and for repeating the transmission of ultrasonic energy from the given point toward the three-dimensional object in successive directions in successive scanning planes, wherein each successive scanning plane has an angular orientation, measured at the given point and with respect to said first scanning plane, which is greater than the angular orientation of any preceding scanning plane as measured at the given point and with respect to the first scanning plane, whereby said source means transmits ultrasonic energy in said first scanning plane and in successive scanning planes having increasing angular orientations with respect to said first scanning plane;

detector means for receiving reflected energy reflected from material of the three-dimensional object as a result of scanning of said three-dimensional object by said source means in said first and said successive scanning planes, and for converting said reflected energy to electrical signals, wherein said detector means is disposed in an image plane displaced from the three-dimensional object, the image plane being perpendicular to the first scanning plane, the image plane being divided into a left image plane and a right image plane;

processing means connected to said detector means for receiving said electrical signals, and for processing said electrical signals to develop reconstructed image data of the three-dimensional object, said reconstructed image data developed by sid processing means corresponding to forward projections of the three-dimensional object into said left image plane to form a first image and into said right image plane to form a second image, said first and second images forming a stereo pair; and display means connected to said processing means and responsive to said reconstructed image data developed by said processing means for displaying said first and second images compositely, thereby displaying said three-dimensional image of the three-dimensional object;

wherein said detector means comprises an ultrasonic transducer disposed in said image plane on a line perpendicular both of said first scanning plane and to said forward projections, said line forming a boundary between said left and right image planes.

10. A three-dimensional imaging system for obtaining a three-dimensional image of an object, comprising:

souce means for transmitting ultrasonic signals having different respective frequencies in different directions toward said object in a first scanning plane, said different directions having increasing angular orientations with respect to a reference direction, and for repeating the transmission of said ultrasonic signals having different respective frequencies toward said object in successive scanning planes parallel said first scanning plane;

detector means for receiving reflected energy reflected from material of said object, and for converting said reflected energy to electrical signals; and processing means connected to said detector means for receiving said electrical signals, and for processing said electrical signals to develop reconstructed image data of said object;

wherein said detector means is disposed in an image plane displaced from said boject and divided into a left image plane and a right image plane, said detector means comprising a plurality of ultrasonic transducers arranged in a line in said image plane, said line forming a boundary between said left image plane and said right image plane, said reconstructed image data comprising forward projections of said object into a first image in said left image plane and a second image in said right image plane, said first and second images forming a stereo pair;

said system further comprising display means for displaying said first and second images compositely, whereby to display said three-dimensional image of said object.

11. The system of claim 10, wherein said source means comprises a plurality of ultrasonic sources arranged in a line in said image plane, said line forming a boundary between said left and right image planes.

12. The system of claim 10, wherein said source means comprises a plurality of ultrasonic sources arranged in a line perpendicular both to said first scanning plane and to said successive scanning planes.

13. The system of claim 10, wherein said plurality of ultrasonic transducers is arranged in a line perpendicular both to said first scanning plane and to said successive scanning planes.

14. The system of claim 10, further comprising additional source means for transmitting ultrasonic signals having different respective frequencies in different directions toward said object in said first scanning plane, said different respective directions having increasing angular orientations with respect to an additional reference direction, and for repeating the transmission of said ultrasonic signals having different respective frequencies in different directions toward said object in said successive scanning planes.

15. A three-dimensional imaging system for obtining a three-dimensional image of an object, comprising:

source means for transmitting ultrasonic signals having different respective frequencies in different directions toward said object in a first scanning plane, said different directions having increasing angular orientations with respect to a reference direction, and for repeating the transmission of said ultrasonic signals having different respective frequencies toward said object in successive scanning planes parallel to said first scanning plane;

detector means connected to said detector means for receiving said electrical signals, and for processing said electrical signals to develop reconstructed image data of said object;

wherein said detector means is disposed in an image plane displaced from said object and divided into a left image plane and a right image plane, said reconstructed image data comprising forward projections of said object into a first image in said left image plane and a second image in said right image plane, said first and second images forming a stereo pair;

said system further comprising display means for displaying said first and second images compositely, whereby to display said three-dimensional image of said object;

wherein said detector means comprises a first plurality of ultrasonic transducers arranged in a first line in said left image plane, each of said transducers of said first plurality of transducers being disposed in a respective one of said first scanning plane and said successive scanning planes, said detector means further comprising a second plurality of ultrasonic transducers arranged in a second line in said right image plane, each of said transducers of said second plurality of transducers being disposed in a respective one of said first scanning plane and said successive scanning planes.

16. The system of claim 15,
wherein said source means comprises a plurality of ultrasonic sources arranged along said first line, each of said sources being disposed in a respective one of said first scanning plane and said successive scanning planes, said system further comprising additional source means for transmitting ultrasonic signals having different respective frequencies in different directions toward said object in said first scanning plane, said different directions having increasing angular orientations with respect to an additional reference direction, and for repeating the transmission of said ultrasonic signals having different respective frequencies in different directions toward said object in said successive scanning planes, said additional source means comprising a plurality of further ultrasonic sources arranged along said second line, each of said further ultrasonic sources being disposed in a respective one of said first scanning plane and said successive scanning planes.

17. A three-dimensional imaging system for obtaining a three-dimensional image of an object, comprising:
source means for transmitting ultrasonic signals having different respective frequencies in different directions toward said object in a first scanning plane, said different directions having increasing angular orientations with respect to a reference direction, and for repeating the transmission of said ultrasonic signals having different respective frequencies in different directions toward said object in successive scanning planes, said successive scanning planes having increasing angular orientations with respect to said first scanning plane;
detector means for receiving reflected energy reflected from material of said object and for converting said reflected energy to electric signals; and
processing means connected to said detector means for receiving said electrical signals, and for processing said electrical signals to develop reconstructed image data of said object;
wherein said detector means is disposed in an image plane displaced from said object and divided into a left image plane and a right image plane, said reconstructed image data comprising forward projections of said object into a first image in said left image plane and a second image in said right image plane, said first and second images forming a stereo pair, said detector means comprising an ultrasonic transducer disposed in said image plane on a line perpendicular both to said first scanning plane and to said forward projections, said line forming a boundary between said left image plane and said right image plane;
said system further comprising display means for displaying said first and second images compositely, whereby to display said three-dimensional image of said object.

18. The system of claim 17, wherein said source means comprises an ultrasonic source disposed in said image plane on a line perpendicular both to said first scanning plane and to said forward projections, said line forming a boundary between said left and right image planes.

19. The system of claim 17, further comprising additional source means for transmitting ultrasonic signals having different respective frequencies in additional different directions toward said object in said first scanning plane, said additional different directions having increasing angular orientations with respect to an additional reference direction, and for repeating the transmission of said ultrasonic signals having different respective frequencies in said additional different directions toward said object in said successive scanning planes.

20. A three-dimensional imaging system for obtaining a three-dimensional image of an object, comprising:
source means for transmitting ultrasonic signals having different respective frequencies in different directions toward said object in a first scanning plane, said different directions having increasing angular orientations with respect to a reference direction, and for repeating the transmission of said ultrasonic signals having different respective frequencies in different directions toward said object in successive scanning planes, said successive scanning planes having increasing angular orientations with respect to said first scanning plane;
detector means for receiving reflected energy reflected from material of said object and for converting said reflected energy to electric signals; and
processing means connected to said detector means for receiving said electrical signals, and for processing said electrical signals to develop reconstructed image data of said object;
wherein said detector means is disposed in an image plane displaced from said object and divided into a left image plane and a right image plane, said reconstructed image data comprising forward projections of said object into a first image in said left image plane and a second image in said right image plane, said first and second images forming a stereo pair;
said system further comprising display means for displaying said first and second images compositely, whereby to display said three-dimensional image of said object;
wherein said detector means comprises a first ultrasonic trasnducer disposed in said image plane on a first line perpendicular both to said first scanning plane and to said forward projections, and a second ultrasonic transducer disposed to said image plane on a second line perpendicular both to said first scanning plane and to said forward projections wherein said source means comprises an ultrasonic source disposed in said image plane on said first line, said system further comprising additional source means for tranmitting ultrasonic signals having different respective frequencies in additional different directions toward said object in said first scanning plane, said additional different direction having increasing angular orientations with respect to an additional reference direction, and for repeating the transmission of said ultrasonic signals having different directions toward said object in said successive scanning planes, said additional source means comprising an additional ultrasonic source disposed in said image plane on said second line.

21. A three-dimensional imaging system for obtaining a three-dimensional image of a three-dimensional object, comprising:
source means disposed at a given point displaced from the three-dimensional object for transmitting ultrasonic energy from the given point toward the three-dimensional object in successive directions in a first scanning plane, each successive direction having an angular orientation, with respect to a reference direction in the first scanning plane, which is greater then the angular orientation with respect to the reference direction of any preceding direction, and for repeating the transmission of ultrasonic energy from the given point toward the three-dimensional object in successive directions in successive scanning planes, wherein each successive scanning plane has an angular orientation, measured at the given point and with respect to said first scanning plane, which is greater than the angular orientation of any preceding scanning plane as measured at the given point and with respect to the first scanning plane, whereby said source means transmits ultrasonic energy in said first scanning plane and in successive scanning planes having increasing angular orientations with respect to said first scanning plane;

detector means for receiving reflected energy reflected from material of the three-dimensional object as a result of scanning of said three-dimensional object by said source means in said first and said successive scanning planes, and for converting said reflected energy to electrical signals, wherein said detector means is disposed in an image plane displaced from the three-dimensional object, the image plane being pependicular to the first scanning plane, the image plane being divided into a left image plane and a right image plane;

processing means connected to said detector means for receiving said electrical signals, and for processing said electrical signals to develop reconstructed image data of the three-dimensional object, said reconstructed image data developed by said procesing means corresponding to forward projections of the three-dimensional object into said left image plane to form a first image and into said right image plane to form a second image, said first and second images forming a stereo pair; and display means connected to said processing means and responsive to said reconstructed image data developed by said processing means for displaying said first and second images compositely, thereby displaying said three-dimensional image of the three-dimensional object;

wherein said detector means comprises a first ultrasonic transducer disposed in said image plane on a first line perpendicular both to said first scanning plane and to said forward projections, and a second ultrasonic transducer disposed in said image plane on a second line perpendicular both to said first scanning plane and to said forward projections; and wherein said source means comprises an ultrasonic source disposed in said image plane on said first line, said system further comprising additional source means disposed at an additional point displaced from the three-dimensional object for transmitting ultrasonic energy from the additional point toward the object in additional successive directions in said first scanning plane, each additional successive direction having an angular orientation, with respect to an additional reference direction in said first scanning plane, which is greater than the angular orientation of any preceding direction, and for repeating the transmission of said ultrasonic energy toward said object in additional successive directions in said successive scanning planes, said additional source means comprising an additional ultrasonic source disposed in said image plane on said second line.

22. The system of claim 21, wherein said first line divides said left image plane into left and right portions, and said second line divides said right image plane into left and right portions, whereby said first ultrasonic transducer is approximately centrally disposed within said left image plane and said second ultrasonic transducer is approximately centrally disposed within said right image plane.

23. A three-dimensional imaging system for obtaining a three-dimensional image of a three-dimensional object, comprising:

source means disposed at a given point displaced from the three-dimensional object for transmitting ultrasonic energy from the given point toward the three-dimensional object in successive directions in a first scanning plane, each successive direction having an angular orientation, with respect to a reference direction in the first scanning plane, which is greater then the angular orientation with respect to the reference direction of any preceding direction, and for repeating the transmission of ultrasonic energy from the given point toward the three-dimensional object in successive directions in successive scanning planes, wherein each successive scanning plane has an angular orientation, measured at the given point and with respect to said first scanning plane, which is greater than the angular orientation of any preceding scanning plane as measured at the given point and with respect to the first scanning plane, whereby said source means transmits ultrasonic energy in said first scanning plane and in successive scanning planes having increasing angular orientations with respect to said first scanning plane;

detector means for receiving reflected energy reflected from material of the three-dimensional object as a result of scanning of said three-dimensional object by said source means in said first and said successive scanning planes, and for converting said reflected energy to electrical signals, wherein said detector means is disposed in an image plane displaced from the three-dimensional object, the image plane being perpendicular to the first scanning plane, the image plane being divided into a left image plane and a right image plane;

processing means connected to said detector means for receiving said electrical signals, and for processing said electrical signals to develop reconstructed image data of the three-dimensional object, said reconstructed image data developed by said processing means corresponding to forward projections of the three-dimensional object into said left image plane to form a first image and into said right image plane to form a second image, said first and second images forming a stero pair; and display means connected to said processing means and responsive to said reconstructed image data developed by said processing means for displaying said first and second images compositely, thereby displaying said three-dimensional image of the three-dimensional object;

wherein each of said electrical signals received by said processing means represents a reflection profile for the energy reflected from the material of the three-dimensional object as a result of scanning in a respective one of said successive directions, said processing means comprising means for performing a differentiation operation to identify reflective peaks in the reflection profile.

24. The system of claim 23, wherein said processing means comprises determining means for determining, for each identified reflective peak, whether or not the reflective peak is significant and, if the reflective peak is insignificant, said processing means computes spatial coordinates of a corresponding point of reflection on the three-dimensional object.

25. The system of claim 24, wherein said processing means comprises additional determining means for determining whether or not the reflective peak is the final reflective peak within the reflection profile, and wherein, if said determining means determines that the reflective peak is not significant, said additional determining means determines whether or not the reflective peak is the final reflective peak within the reflection profile, and said processing means procesess a subsequent reflective peak if the reflective peak is not the final reflective peak within the reflection profile, and said processing means processes a subsequent reflection profile if the reflective peak is the final reflective peak within the reflection profile.

26. The system of claim 24, wherein said processing means comprises additional means for determining whether or not the computed spatial coordinates of the corresponding point of reflection are within a volumetric field of interest and, if the computed spatial coordinates of the corresponding point of reflection are within the volumetric field of interest, said processing means computes the coordinates of the projection of the corrsponding point of reflection onto said left image plane and said right image plane, respectively.

27. The system of claim 26, wherein said processing means comprises further determining means for determining whether or not the reflective peak is the final reflective peak within the reflection profile, and wherein, if said additional determining means determines that the computed spatial coordinates of the corresponding point of reflection are not within the volumetric field of interest, said further determining means determines whether or not the reflective peak is a final reflective peak within the reflection profile and, if the reflective peak is not a final reflective peak within the reflection profile, said processing means processes a subsequent reflective peak within the reflection profile, and, if the reflective peak is a final reflective peak within the reflection profile, said processing means processes a subsequent reflection profile.

28. The system of claim 26, wherein said processing means comprises further determining means for determining whether or not the reflective peak is the final reflective peak within the reflection profile, and wherein, after said processing means computes the coordinates of the projection of the corresponding point of reflection onto said left image plane and said right image plane, respectively, said further determining means determines whether or not the reflective peak is a final reflective peak within the reflection profile, and, if the reflective peak is not a final reflective peak within the reflection profile, said processing means processes a subsequent reflective peak, and, if the reflective peak is the final reflective peak within the reflection profile, said processing means processes a subsequent reflection profile.

29. The system of claim 24, wherein said processing means comprises computing means for computing the spatial coordinates of the corresponding point of reflection from a plurality of angles defining a direction of transmission of the ultrasonic energy transmitted by said source means and from a time interval between transmission by said source means of the ultrasonic energy from the given point toward the three-dimensional object and reception by said detector means of the reflected energy reflected from the material of the three-dimensional object.

30. The system of claim 29, wherein said processing means comprises computing means for computing the spatial coordinates of the corresponding point of reflection from the following equations:

$$\vec{X} = kT/2 \cdot \cos \phi_i \vec{I};$$

$$\vec{Y} = kT/2 \cdot \cos \phi_j \vec{J}; \text{ and}$$

$$\vec{Z} = kT/2 \cdot \cos \phi_k \vec{K};$$

where k is a scaling factor, T is the time interval between transmission of the ultrasonic energy and reception of the reflected energy, $\vec{I}$, $\vec{J}$ and $\vec{K}$ are unit vectors in three-dimensional space, and $\phi_i$, $\phi_j$ and $\phi_k$ are angles measured with respect to the unit vectors and defining the direction of transmission of the ultrasonic energy.

* * * * *

UNITED STATES PATENT AND TRADEMARK OFFICE
CERTIFICATE OF CORRECTION

PATENT NO. : 4,747,411
DATED : May 31, 1988
INVENTOR(S) : Robert S. Ledley

It is certified that error appears in the above—identified patent and that said Letters Patent is hereby corrected as shown below: On the title page In the heading, item [73], the assignee should be -- National Biomedical Research Foundation --.

Signed and Sealed this

Eleventh Day of October, 1988

*Attest:*

DONALD J. QUIGG

*Attesting Officer*  *Commissioner of Patents and Trademarks*